Jan. 7, 1969  R. T. GROVER  3,420,536
SPLIT RING PACKING WITH ELASTOMERIC SUPPORT
FOR ROTATIVE AND RECIPROCABLE PARTS
Filed June 1, 1966

Inventor
Richard T. Grover
By Wheeler, Wheeler & Wheeler
Attorneys

United States Patent Office 3,420,536
Patented Jan. 7, 1969

3,420,536
SPLIT RING PACKING WITH ELASTOMERIC
SUPPORT FOR ROTATIVE AND RECIPRO-
CABLE PARTS
Richard T. Grover, 3337 S. New York Ave.,
Milwaukee, Wis. 53207
Filed June 1, 1966, Ser. No. 554,481
U.S. Cl. 277—165                                    3 Claims
Int. Cl. F16j 9/06; 15/16; F16k 41/00

ABSTRACT OF THE DISCLOSURE

The invention contemplates the cooperative association in a packing groove of one or more split rings preferably of metal and of such dimensions as to have inherent bias inwardly or outwardly against a relatively movable surface, such bias being supplemented by the bias of an associated elastomeric ring which, in addition to providing supplemental bias, also provides supplemental packing in an axial as well as a radial direction. The supplemental axial packing is very advantageous in preferred constructions wherein a stack of split ring and elastomeric ring assemblies is preferably used between two relatively reciprocable parts. One of these has a channel to receive the rings, at least one ring being biased inwardly upon one of said parts and the other being biased outwardly into engagement with the other of said parts so that the rings are radially staggered. The elastomeric rings may have other than circular cross section and are not necessarily O-rings. Preferably, however, both of said split rings have elastomeric O-rings supplementing their inherent bias and providing axial seal as well as radial seal substantially to close the channel against leakage.

As a separate feature of the invention, each split ring used in my improved packing is preferably made by fracturing a prefabricated somewhat resilient ring (usually metallic) in a generally radial direction at one point only, the resulting integral split ring having its severed ends adapted for interlocking engagement due to the fracture and being of such dimensions, according to the desired position of use in the staggered assembly, that either its inner periphery or its outer periphery will accurately fit an associated cylindrical surface when the free ends of the ring are closed upon each other.

Background of the invention

Conventional piston rings and the like are elliptical as fabricated and may have ends which lap to form a joint, the initial form being intended to be such that when the ends are lapped, the resulting ring will have a cylindrical bearing surface and will be biased by its change in form. In the instant construction, the ring initially has precisely the desired form and the bias which restores it to that form will hold it in contact with the work but without any substantial pressure until the inherent bias is supplemented by the bias of the associated O-ring.

Description of the invention

Figure 1:
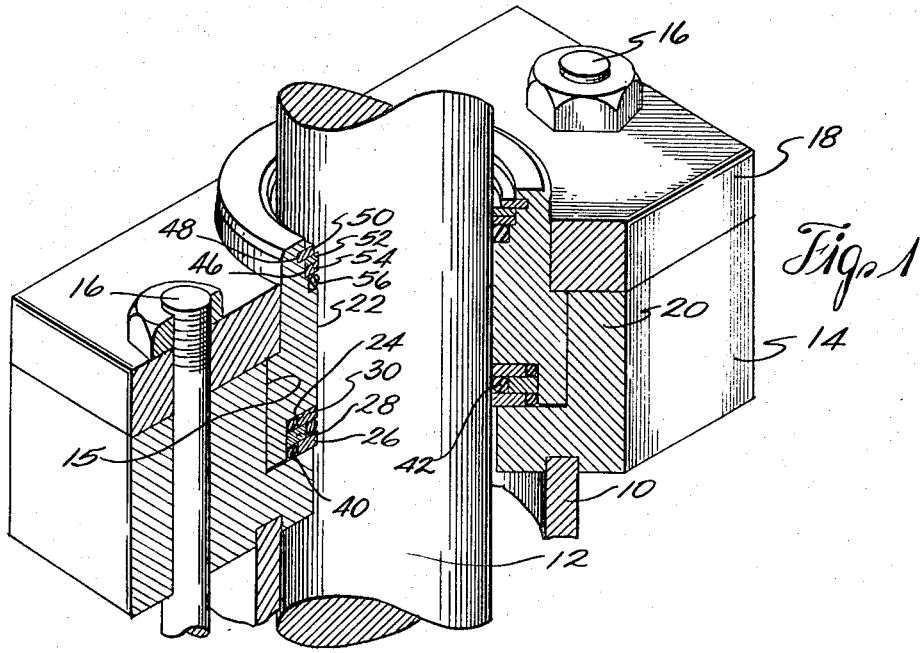
Figure 2:
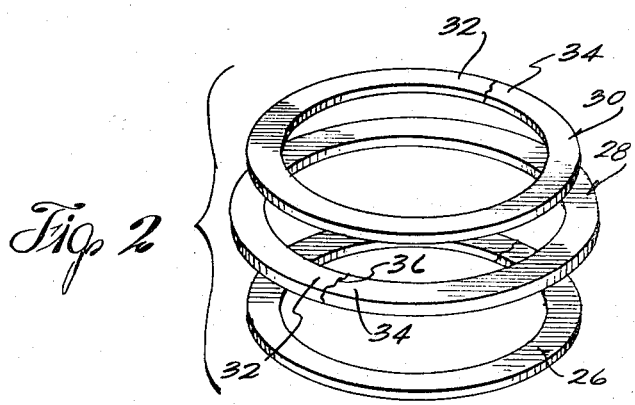
Figure 3:
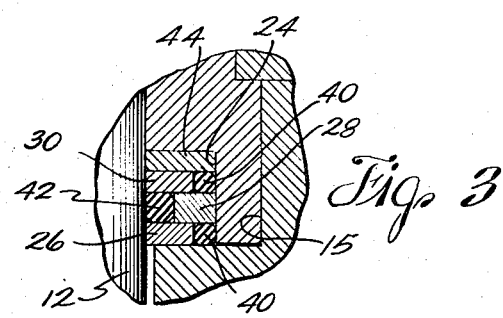

In the drawings:
FIG. 1 is a view in perspective, with parts broken away, fragmentarily showing a reciprocable part and its bearing and the application of my packing thereto.
FIG. 2 is a view in perspective showing in mutually separated positions the metal components of some of the packing shown in FIG. 1.
FIG. 3 is a view on a greatly enlarged scale fragmentarily showing in section a modified embodiment of the invention.

In FIG. 1, I have fragmentarily illustrated a cylinder 10 in which piston rod 12 is reciprocable through a packed bearing provided in the cylinder head 14. The latter is conventionally anchored by bolts 16 which pass through a retaining plate 18. The retaining plate positions within the cylinder head counterbore 15 a shouldered bearing member 20 for the rod 12. The bore 22 of member 20 is closely fitted to the rod. In a counterbore 24 is some of the packing to which this application is primarily addressed.

The three rings 26, 28 and 30 are superimposed. Rings 26 and 30 are of different radius from ring 28, whereby the rings are radially staggered in the stack. Each ring is a split ring having free ends 32, 34 formed by fragmentation of the initially solid ring, as indicated by the irregular radial line 36 (FIG. 2). This construction permits the rings to be made with truly circular inner and outer peripheries, it being apparent that when the free ends 32 and 34 are engaged on the line of fragmentation, the true circular form of the ring will be restored.

In the example illustrated, each of the rings 26 and 30 has an inner periphery of a radius which is either exactly equal to the radius of the rod 12 or is only slightly smaller. Displacement of the free ends 32, 34 enable the rings to be moved axially of the rod but when the expanding pressure is released, the inherent contractile bias of the rings will cause them to engage the surface of the rod with a snug fit. Assuming that the inner perimeter of the given ring is exactly the same as the outer perimeter of the rod, the ring will be left without any inherent bias when placed on the rod.

Some of the bias may be provided for in the material of which the rings are made. As in the case of ordinary motor vehicle engine and piston rings, it is permissible to make the rings of cast iron, which has a substantial degree of resilience. However, almost any material may be used (even non-metallic), depending on the service to which the split ring is to be put. Resilience is preferred but may be supplied by the elastomeric ring, if desired. In any event, it will be apparent that in the case of a fractured ring, nearly all bias of the ring per se is relieved when the free ends 32, 34 of the ring are engaged with each other. Only to the extent that the packed surface spreads these free ends apart will any bias remain in such a ring. Since little ring bias remains when the ring is engaged with the work, it is permissible in some cases to use very stiff material; in other cases, to have little, if any, residual bias.

Wherever reference is made herein to split rings of metal, or to elastomeric rings which are O-rings, it will be understood that I have in mind the preferred structures and that other rings of the characteristics specified are regarded as equivalent.

It will be observed in FIG. 1 that each ring 26 and 30 is encircled by an elastomeric ring 40 which is at least equal in thickness to the split packing ring and by which additional bias is supplied in any predesigned relative proportions. The dimensions of these split packing rings in relation to the counterbore 24 are such that each elastomeric ring will tend to be under compression radially as well as axially when associated with the split metal ring with which it coacts. Not only the distension and elasticity of the O-ring but also the centripetal thrust resulting from its confinement in the counterbore will subject its cooperating split metal ring to compression to hold the split ring snugly against the rod 12 which it is desired to pack.

In the case of the intervening ring 28, it is the outer periphery rather than the inner periphery which was initially in true circular form and is in contact with a cylindrical surface. In the device illustrated, the ring 28 has slightly greater thickness in an axial dimension than either of the companion rings 26 and 30 and it also differs in radius so that the rings are staggered as best shown in FIG. 3. Accordingly, the O-ring 42 is likewise thicker than the O-rings 40 and it is used on the inside of the ring 28 rather than the outside thereof. Its thickness slightly exceeds the thickness of ring 28 in an axial direction and it also slightly exceeds the clearance between the ring 28 and the external surface of the rod 12 which is being packed.

In consequence of this arrangement, the entire assembly of rings is under axial pressure and each ring individually is under radial pressure either inwardly or outwardly due to the resilient expansion of the accompanying O-ring.

It will also be observed from inspection of FIG. 1 that the axial pressure upon the O-ring is provided in part by the surface 32 of bearing member 22 at the top end of the counterbore 24 and in part by the split metal ring 28 which intervenes between the upper and lower O-rings.

Also illustrated in FIG. 1 is the use of a set of scraping rings for cleaning the rod 12 to remove foreign matter from the surface of the rod before the rod enters the packing per se. In the bearing member 22, there is a counterbore at 46 from which opens an annular groove 48 to receive snap ring 50. The snap ring retains in the counterbore two superimposed split rings 52 and 54 which may be generally of the type used at 26 and 32. These rings are pressed toward the snap ring 48 by the O-ring 56 confined in the counterbore between an internal cylindrical surface provided by the counterbore of bearing member 22 and by an external cylindrical surface of the rod 12. Axially it is confined between the bottom of the counterbore and the undersurface of the split ring 54. Since the two split rings 52 and 54 are contractilly engaged with the external surface of the rod 12, they will wipe oil and dust and other foreign matter from the rod. They do not need to be uregd centripetally by O-rings because they are not relied upon for packing but only to perform this cleaning or wiping function.

The O-rings are elastomeric, made either of natural or synthetic rubber or other synthetic resins so that they constantly tend to resume the true circular cross section from which they had been deformed by axial pressure in the assembly of the bearing member 22 under thrust of retaining plate 18 in the counterbore 42 of cylinder head 14.

As shown in FIG. 3, an auxiliary filling ring 44 may be inserted in the stack. If allowed for in the design, it will not in any way affect the functioning of the parts. It is normally desired that the asembled stack in its entirety be subject both to radial and to axial compresison.

I claim:
1. An assembly for mounting upon one of two relatively movable parts for engagement with the bearing surface of another of such parts, one of which parts has a channel, said assembly comprising at least one split ring having inner and outer peripheries and opposing faces, and free ends disposed in the channel of said one part, and bearing on a periphery of the other said part, an O-ring confined in said channel and peripherally engaged under pressure with said split ring, the split ring comprising one of a stack of split rings wherein successive split rings are radially staggered, one ring of the stack having an O-ring engaged under centripetal pressure upon its outer periphery and an adjacent split ring of said stack having an O-ring engaged under radial pressure with its inner periphery, at least one of said O-rings respectively being thicker than the associated split ring and the said stack of split rings and O-rings being confined under axial pressure in said channel.

2. An assembly according to claim 1 in which at least one of said O-rings is not only engaged with the periphery of one of said split rings but is also engaged under pressure between opposing surfaces of two other split rings.

3. An assembly for mounting upon one of two relatively movable parts for engagement with the bearing surface of another of such parts, one of which parts has a channel, said assembly comprising as least one split ring having inner and outer peripheries and opposing faces, and free ends disposed in the channel of said one part, and bearing on a periphery of the other said part, an O-ring confined in said channel and peripherally engaged under pressure with said split ring, the members being relatively reciprocable and the said part closes said channel at its ends, there being a plurality of staggered split rings confined within said channel and alternately subject to O-ring bias in radially opposite directions and filling the channel, the several O-rings being under axial compression against faces of split rings abutted thereby.

References Cited
UNITED STATES PATENTS

| | | | |
|---|---|---|---|
| 2,860,936 | 11/1958 | Habenicht | 277—165 X |
| 3,068,018 | 12/1962 | Tydeman | 277—165 |
| 3,235,274 | 2/1966 | Cain et al. | 277—142 |

SAMUEL ROTHBERG, *Primary Examiner.*

U.S. Cl. X.R.

277—24, 125